United States Patent
Cate et al.

[11] Patent Number: 6,129,625
[45] Date of Patent: Oct. 10, 2000

[54] METHOD OF TRIMMING A MEAT PORTION BY ULTRASONIC AND ELECTRONIC ANALYSIS

[75] Inventors: Stephen H. Cate, Johnston; Douglas McCloskey, Altoona, both of Iowa

[73] Assignee: Townsend Engineering Company, Des Moines, Iowa

[21] Appl. No.: 09/383,774

[22] Filed: Aug. 26, 1999

[51] Int. Cl.[7] .............................. A22B 5/16; A22C 17/12
[52] U.S. Cl. ..................... 452/127; 452/157; 452/158; 452/134
[58] Field of Search .................... 452/127, 125, 452/158, 157, 156, 134

[56] References Cited

U.S. PATENT DOCUMENTS

| | | | |
|---|---|---|---|
| 3,735,247 | 5/1973 | Harker | 452/134 |
| 4,209,878 | 7/1980 | Albert | 452/134 |
| 4,246,837 | 1/1981 | Chenery | 452/158 |
| 4,534,548 | 8/1985 | Hanau | 452/127 |
| 4,738,004 | 4/1988 | Lapeyre | 452/158 |
| 4,785,817 | 11/1988 | Stouffer . | |
| 4,947,517 | 8/1990 | Boekel . | |
| 5,324,228 | 6/1994 | Vogeley, Jr. | 452/158 |
| 5,353,796 | 10/1994 | Schroeder et al. . | |
| 5,558,573 | 9/1996 | Basile, II et al. | 452/127 |
| 5,580,306 | 12/1996 | Young et al. . | |
| 5,613,493 | 3/1997 | Schafer . | |
| 5,641,907 | 6/1997 | Haagensen . | |

FOREIGN PATENT DOCUMENTS

| | | | |
|---|---|---|---|
| 0 324 522 B1 | 7/1995 | European Pat. Off. | A22C 17/00 |
| 0 523 865 B1 | 1/1996 | European Pat. Off. | G01B 17/02 |

*Primary Examiner*—Willis Little
*Attorney, Agent, or Firm*—Zarley, McKee, Thomte, Voorhees & Sease

[57] ABSTRACT

A method of trimming cuts of meat by imposing on an electronic controller the trim parameters for a meat portion. The meat portion is then scanned with an electronic ultrasonic sensor to locate and identify the natural physical makeup of the meat portion. After determining the natural conditions that exist in the meat portion, the sensor transmits signals to the controller to advise the controller of the nature and location of the sensed condition. That data is compared to the trim parameters imposed on the controller which then determines the trim requirements for that meat portion in that sensed condition. The controller then controls a meat trimming mechanism to trim the meat portion consistent with the parameters of the foregoing evaluation.

4 Claims, 4 Drawing Sheets

METHOD OF TRIMMING A MEAT PORTION BY ULTRASONIC AND ELECTRONIC ANALYSIS

BACKGROUND OF THE INVENTION

The need for the invention has arisen from meat processors being required to provide leaner cuts of meat to their customers and/or meat cuts with specific trim requirements. Quite often the products they produced must be hand trimmed to meet the customer lean specification. This is both labor intensive and results in the loss of valuable lean or desired product.

For example, with pork butts (shoulders), it is common to require that several square inches of the Trapezius muscle be exposed to meet customer trim requirements. For pork hams, it is common practice to specify trim requirements for the amount of muscle tissue exposed and/or the amount of fat or membrane left on the muscle. Pork loins have similar requirements for the amount of muscle exposure required to meet product specifications.

The current methods used to determine muscle location for trimming purposes are guessing where the trimming should take place and trimming several layers of materials covering the muscle to be exposed until the proper trim has been achieved. On the one hand, guessing results in poor yields due to inaccurately locating the muscle or surface to be trimmed/separated. On other hand, removing covering materials several layers at a time is time consuming, ergonomically detrimental to the trimmer, and also results in yield losses.

It is also not common to identify lean for trimming purposes using a non-invasive method. Probes that use electronic eyes to discern the difference between fat and lean have been used to adjust for fat thickness relative to a lean layer. These probes take a reading of the layers to identify the fat or lean by the amount of light each reflects. They do not identify a specific muscle or substance as a reference point for trimming. A distinct disadvantage of these probes is that they puncture the product to be trimmed and cause damage to the product. Ultrasound transducers eliminate this unwanted result.

Use of Ultrasound is common in the meat industry. It is widely used as a means for grading carcasses to determine their value based on fat and lean content. It is also used to determine a fat to lean ratio or the depth of a muscle or the thickness of fat, again for grading purposes. The use of Ultrasound for the purpose of removing a layer of fat from meat, particularly pork bellies, to achieve a preferred thickness of the belly is old. The use of Ultrasound to predict leanness, lean to fat, and thickness of a piece of meat is common place. U.S. Pat. No. 4,947,517 uses Ultrasound to facilitate trimming, but fails to reference pre-established trim requirements.

It is therefore a principal object of this invention to use Ultrasound to identify natural conditions in the meat portion; evaluate these conditions electronically, and control the trimming of the meat portion in accordance with predetermined trimming standards and requirements used in the evaluation.

These and other objects will be apparent to those skilled in the art.

SUMMARY OF THE INVENTION

The invention uses ultrasonic sensors for the purpose of locating the muscles, bone or other material in the carcass or part of the carcass to be used as a reference point to achieve trim specifications for a particular primal cut or piece of meat. The ultrasound pulses are sent to a computer that adjusts the trimming device to remove the covering material, generally fat, membrane or skin, based upon the computer's interpretation of the data supplied versus the specification required. The trimming device itself will include or can include skinning machines, defatting machines, and machines for separating bone, fat, skin and membrane.

The ultrasonic analysis to determine trim requirements can take place either before the carcass is separated into primal cuts or immediately before the trimming device. In the case of carcass analysis, the computer software will sequentially number the piece so that the trimming device will later know which carcass the cut being trimmed came from and thus can make the proper adjustments for that piece.

The reason for this new invention is the use of ultrasonic analysis for the purpose of trimming meat to a predetermined requirement. The ultrasound will be used to locate reference markers such as a muscle or muscle group, bone, skin, or distinct fat layer to calculate the proper amount of covering material to be removed for the proper amount of lean or residual material to be left behind.

DESCRIPTION OF THE PREFERRED EMBODIMENT

Figure 1:
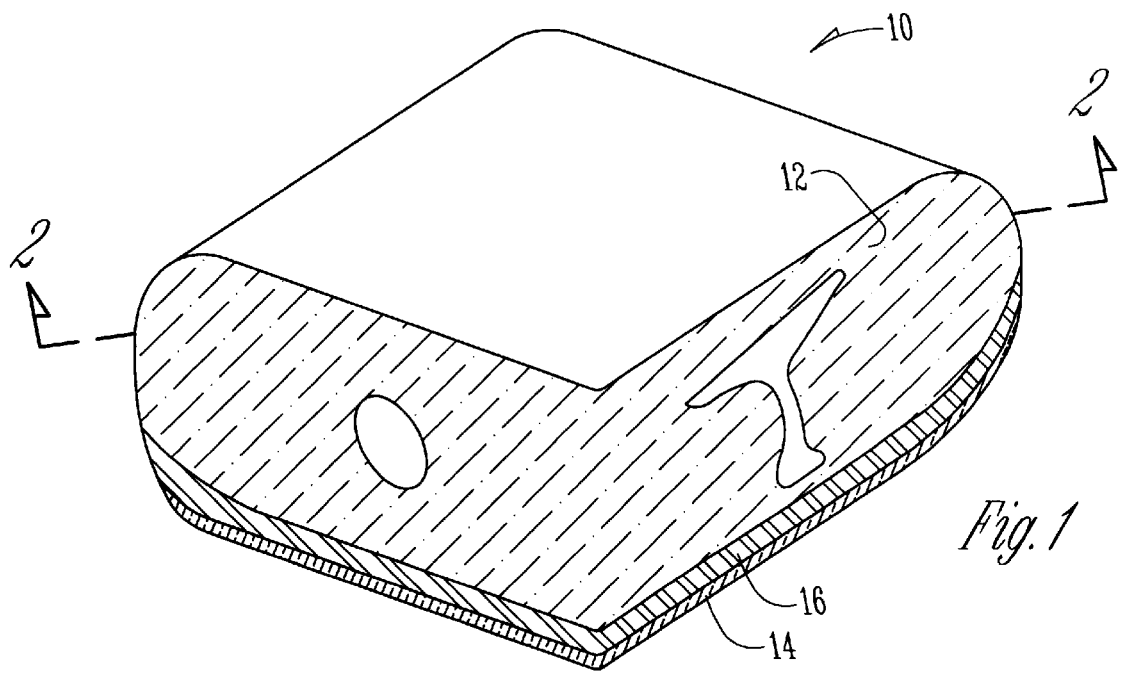
FIG. 1 is a perspective view of a typical meat portion to be trimmed.
Figure 2:
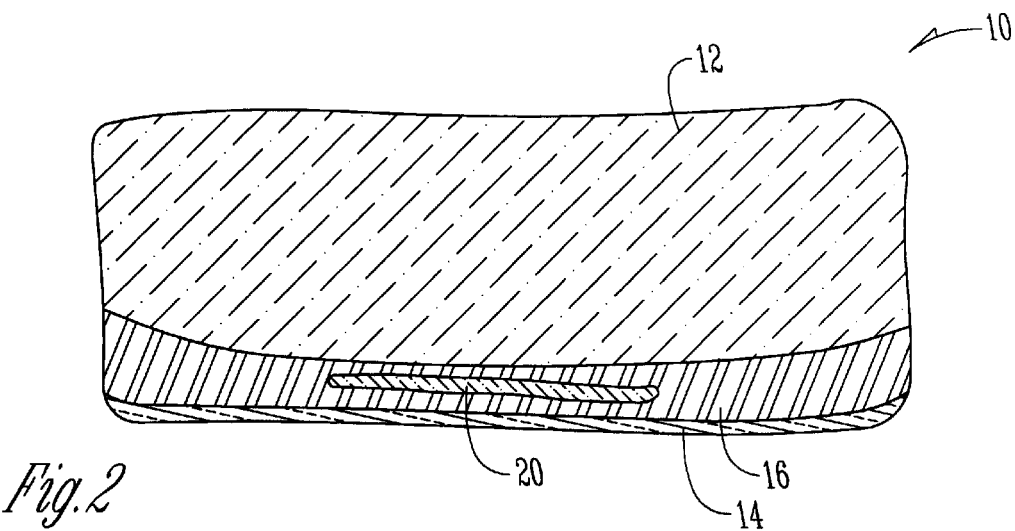
FIG. 2 is a sectional view taken on line 2—2 of FIG. 1.

With reference to FIGS. 1 and 2, the numeral 10 designates a typical meat portion which has lean meat 12, a layer of skin 14, a layer of fat 16, a typical bone 18, and a muscle 20 (FIG. 2).

Figure 3:
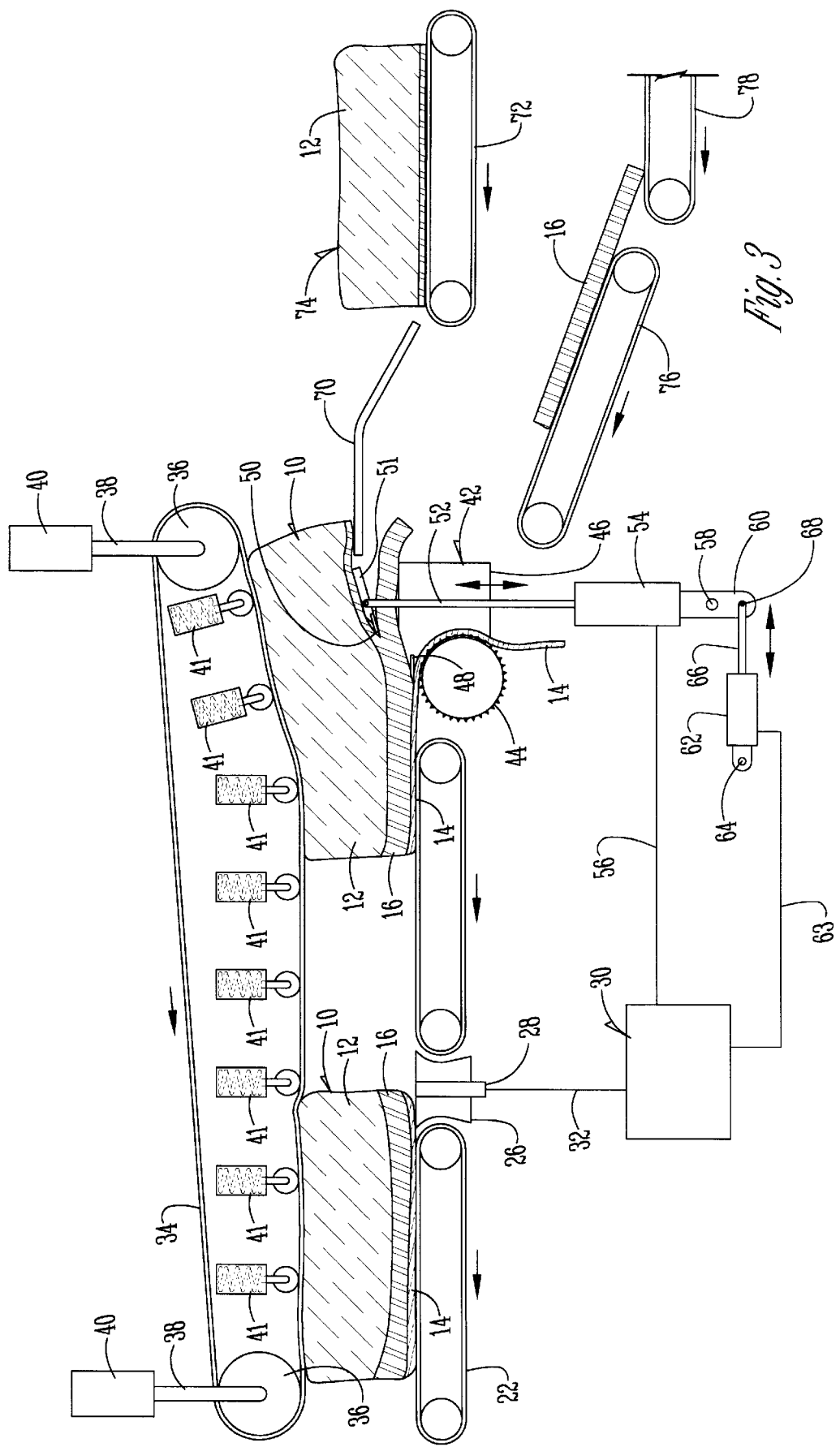
FIG. 3 is a schematic view of the apparatus for trimming the meat portions of FIGS. 1 and 2.
Figure 4:
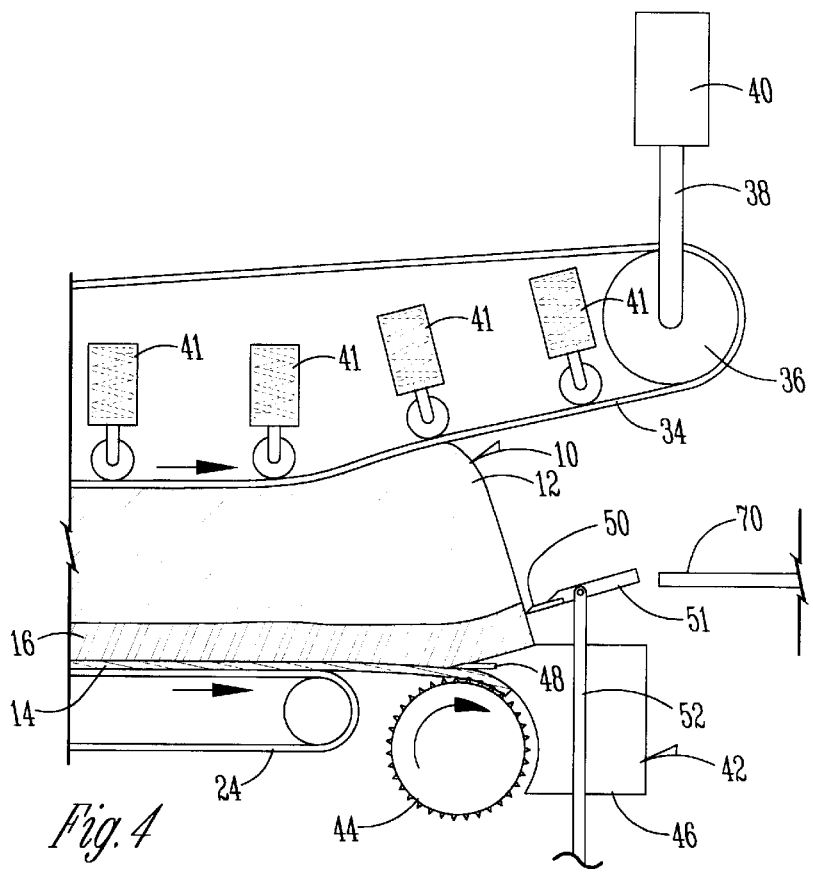
FIG. 4 is an enlarged scale elevational view of the starting position of the trimming blade.
Figure 5:
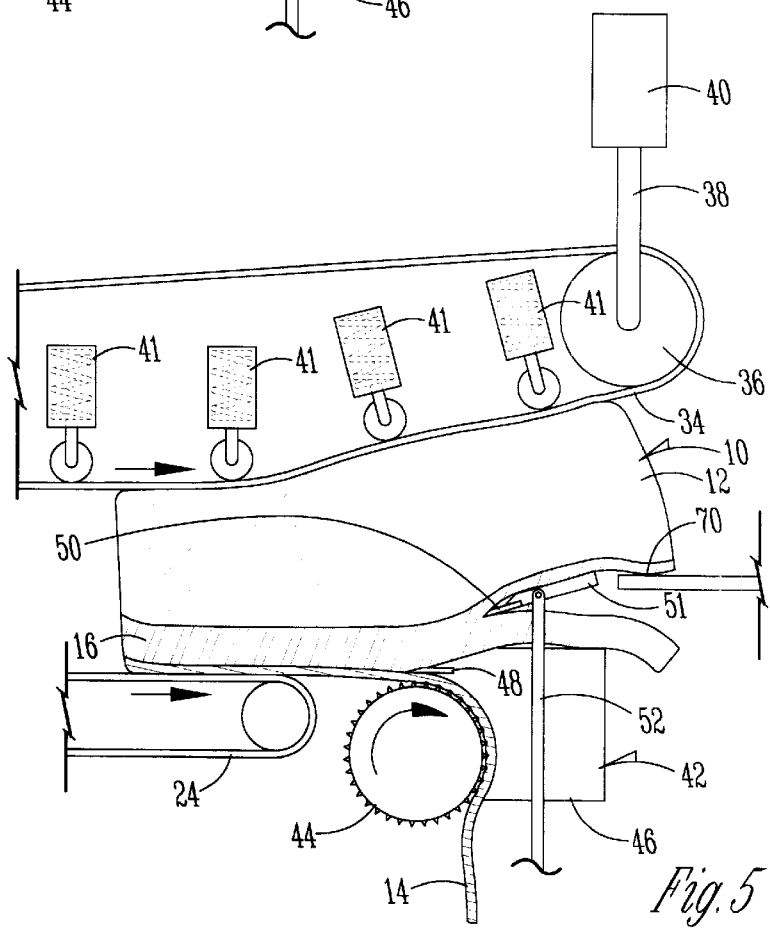
FIG. 5 is a view similar to that of FIG. 4 but shows the trimming blade as it commences its cut.

With reference to FIGS. 3, 4 and 5, a conveyor 22 is spaced from but in alignment with conveyor 24 which are powered by any conventional power means (not shown). The space in between adjacent ends of conveyors 22 and 24 contains an insulated fitting 26 which houses a vertically disposed ultrasound transducer 28 which has typical capabilities of emitting and receiving ultrasonic waves and transmitting electronic signals in response to that activity. The numeral 30 represents a conventional computer or controller which is connected to transducer 28 by line 32.

A hold down idler belt 34 of continuous construction has conventional rolls 36 at its opposite ends mounted on conventional axle supports 38. The axle supports are in turn mounted in conventional spring loaded cylinders 40 to permit vertical movement of the axle supports 38. A plurality of spaced conventional spring loaded idler wheels 41 are mounted within the confines of the continuous belt 34.

A conventional skinning machine 42 having an elongated toothed gripper roll 44 is positioned adjacent the discharge end of conveyor belt 24. The skinning machine 42 includes a conventional concave shoe 46 to receive a portion of the diameter of gripper roll 44. An elongated conventional skinning blade 48 is mounted in shoe 46.

A trimming blade 50 is secured to the forward edge of blade mount 51 which in turn is pivotally secured to the upper ends of vertical rods 52. The lower ends of the pair of rods 52 are mounted in a pair of actuators 54 which are connected to controller 30 by lines 56. The actuator 54 is mounted on pivot pin 58 located in arms 60 which extends from the lower end of the actuator 54.

A horizontally disposed actuator 62 is connected to controller 30 by line 63 and is mounted in any convenient fashion by pivot pin 64 to pivot about a horizontal axis. A conventional rod 66 extends from the actuator 62 and is pivotally connected by pin 68 to the lower end of arm 60.

Actuator 54 serves to raise and lower rods 52 to raise and lower the trim blade 50. Similarly, actuator 62 serves to pivot arm 60 about pivot 58 which in turn changes the vertical attitude of rods 58 and the angle of attack of blade 50 on blade mount 51.

A conventional chute 70 is located downstream of the trim blade 50 as best shown in FIG. 3. It serves to deposit trimmed meat portions on conveyor 72 to be delivered to a further work station. Such a trimmed meat portion 74 is shown mounted on conveyor 72.

A further conventional conveyor 76 is located downstream of skinning machine 42 and serves to move a trimmed layer of fat 16 to the conveyor 78 for suitable disposal.

In operation, the method of this invention calls for computer or controller 30 to be pre-programmed with the parameters for trimming a meat portion depending upon what natural conditions of muscle, bone, fat layers and the like occur in the meat portion. The ultrasonic transducer or sensor 28, along with others of like construction, extend across the pathway between conveyors 22 and 24 so that a meat portion 10 moving towards skinning machine 42 on conveyor 22 can be scanned along its lower surface. The rebounding ultrasonic waves reflecting from various natural conditions detected in the scanning of the meat portion 10 are transmitted by electrical pulses through line 32 to computer 30. The data received by the controller 30 indicates the natural conditions sensed whether it be a muscle, muscle group or the like.

The controller 30 is pre-programmed to determine the trimming conditions on a meat portion wherein the natural conditions within the meat are sensed. The controller 30 also has been advised by the sensor 28 as to the location of the natural conditions sensed in addition to the specific nature of the condition whether it be a muscle or a bone.

Figure 6:
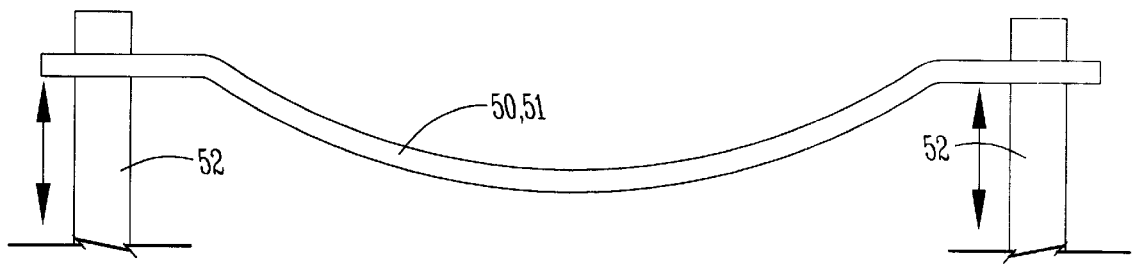
FIG. 6 is a schematic elevational view of the trimming blade in one position of its trimming activity.
Figure 7:
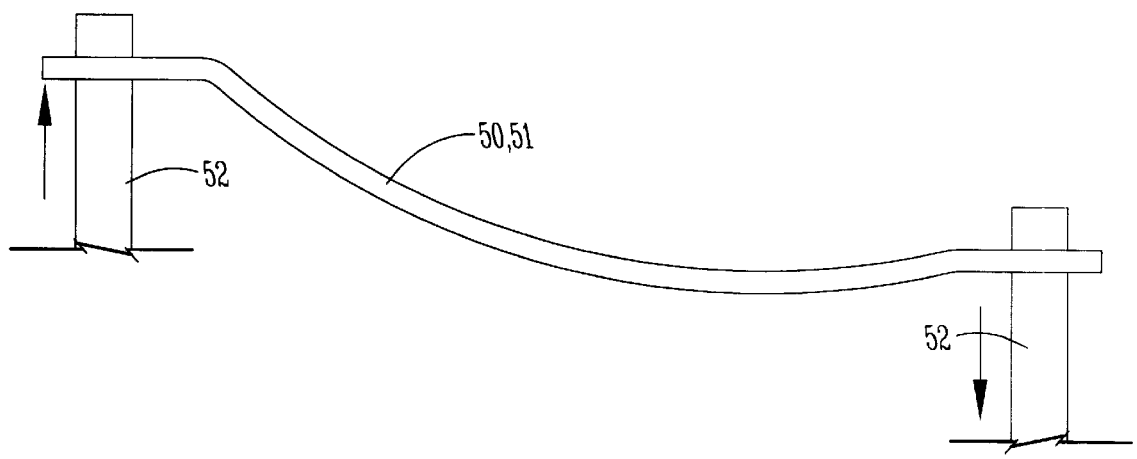
FIG. 7 is a view similar to that of FIG. 6 but shows the trimming blade in an alternate position of its trimming activity.

The controller 30 thereupon consults its pre-programmed parameters from its memory and electronically signals through lines 56 and 63 the actuators 54 and 62, respectively, so as to program the trimming blade 50. For example, the controller 30 may cause the shafts 52 to move from the position shown in FIG. 6 where blade 50 is in a substantial horizontal position to the position shown in FIG. 7 where the blade 50 is moved into a laterally tilted position to accommodate a certain condition sensed in a meat portion by the computer 30. Similarly, the controller 30 may actuate the actuator 62 to movement whereby the actuator 54 will pivot about axis 58 to alter the cutting attitude of the blade 50.

It should be understood that sensor 28 could have a wave-emitting ability other than ultrasound, such as x-rays, without departing from the scope of the invention.

It is therefore seen that this invention will permit the natural conditions of the meat portion such as muscles, muscle groups, etc. to be detected and located; whereupon the controller can control the position of the trimming blade so as to accommodate the natural condition sensed. This can all be done in accordance with pre-programmed parameters so as to create substantial uniformity in dealing with the trim characteristics of each natural condition sensed. This invention will therefore achieve at least all of its stated objectives.

What is claimed is:

1. A method of trimming cuts of meat, comprising, imposing on an electronic controller the trim parameters for a meat portion, scanning the meat portion with an electronic ultrasonic sensor to locate and identify the natural physical makeup of the meat portion including skin, fat, bone, muscle, or membrane conditions in the meat portion, whereby the sensor transmits ultrasound waves into the meat portion and will receive reflected waves when such conditions exist within the meat portion, transmitting an electronic signal from the sensor to the controller to advise the controller of the nature and location of a sensed condition in the meat portion, comparing the location and nature of the sensed condition with the trim parameters for the sensed condition, determining the trim requirements of the meat portion for the nature and location of the sensed condition from the trim parameters, trimming the meat portion by a meat trimming mechanism, controlling the meat trimming mechanism by signals transmitted to the mechanism based upon an evaluation of the trim requirements for the sensed condition as determined by the controller.

2. A method of trimming cuts of meat, comprising, imposing on an electronic controller the trim parameters for a meat portion, scanning the meat portion with an electronic sensor to locate and identify the natural physical makeup of the meat portion including skin, fat, bone, muscle, or membrane conditions in the meat portion, whereby the sensor transmits waves into the meat portion and will receive reflected waves when such conditions exist within the meat portion, transmitting an electronic signal from the sensor to the controller to advise the controller of the nature and location of a sensed condition in the meat portion, comparing the location and nature of the sensed condition with the trim parameters for the sensed condition, determining the trim requirements of the meat portion for the nature and location of the sensed condition from the trim parameters, trimming the meat portion by a meat trimming mechanism, controlling the meat trimming mechanism by signals transmitted to the mechanism based upon an evaluation of the trim requirements for the sensed condition as determined by the controller.

3. An apparatus for trimming cuts of meat, comprising, a machine having an electronic sensor for scanning a meat portion to locate and identify the natural physical make up of the meat portion including skin, fat, bone, muscle or membrane conditions in the meat portion;

means on the sensor to transmit signal producing waves into the meat portion and to receive reflected waves when such conditions exist within the meat portion;

signal transmitting means on the sensor connected to a controller to advise the controller of the nature and location of a sensed condition in the meat portion;

the controller having a memory means with data thereon relating to trim parameters for a meat portion;

the controller including circuitry for comparing the location and nature of the sensed condition of the meat portion with the trim parameters for the sensed condition in the memory of the controller, to permit the controller to determine the trim requirements of the meat portion for the nature and location of the sensed condition from the trim parameters;

means on the machine for trimming the meat portion by a meat trimming mechanism;

the controller being operatively connected to the meat trimming mechanism by signals transmitted to the mechanism from the controller based upon an evaluation of the trim requirements for the sensed condition as determined by the controller.

4. The apparatus of claim 3 wherein the sensor is an electronic ultrasonic sensor and wherein the sensor transmits and received ultrasonic waves.

* * * * *